(12) United States Patent
Bhattacharya et al.

(10) Patent No.: US 12,719,661 B2
(45) Date of Patent: Aug. 25, 2026

(54) TIERED DISTRIBUTED LEDGER

(71) Applicant: Wells Fargo Bank, N.A., San Francisco, CA (US)

(72) Inventors: Niladri Bhattacharya, Livingston, NJ (US); Frank H. Dix, New York, NY (US); Michael Charles Reynolds, Avon, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 31 days.

(21) Appl. No.: 19/020,953

(22) Filed: Jan. 14, 2025

(65) Prior Publication Data

US 2026/0205264 A1 Jul. 16, 2026

(51) Int. Cl.
*H04L 9/08* (2006.01)
*H04L 9/32* (2006.01)

(52) U.S. Cl.
CPC .......... *H04L 9/0819* (2013.01); *H04L 9/3247* (2013.01)

(58) Field of Classification Search
CPC .... H04L 9/0819; H04L 9/3247; H04L 9/0822
USPC .......................................................... 713/171
See application file for complete search history.

(56) References Cited

U.S. PATENT DOCUMENTS 11,023,423 B2 * 6/2021 Glasser ................. H04L 9/3239
11,769,146 B1 9/2023 Houseworth et al.
2017/0046792 A1 * 2/2017 Haldenby .......... G06Q 10/0631
2019/0026450 A1 * 1/2019 Egner ..................... G06F 21/44
2019/0222422 A1 * 7/2019 Purves ................. G06Q 20/322
2021/0109919 A1 * 4/2021 Raj ......................... G06F 16/27
2021/0294890 A1 * 9/2021 Pham .................... H04L 9/3226

* cited by examiner

*Primary Examiner* — Kaylee J Huang
(74) *Attorney, Agent, or Firm* — SCHWEGMAN LUNDBERG & WOESSNER, P.A.

(57) ABSTRACT

Various examples are directed to systems and methods for using a tiered distributed ledger. The financial institution system may access onboarding request data from a computing device associated with a first prospective customer and use identifier data included in the onboarding request data to identify a first block of a distributed ledger comprising first data describing the first prospective customer, where the first data is unencrypted. The financial institution system may also use the identifier data to identify a second block of the distributed ledger comprising second data describing the first prospective customer different than the first data, where the second data is encrypted. The financial institution system may access first cryptographic key data associated with the second block of the distributed ledger and decrypting the second data using the first cryptographic key data.

20 Claims, 9 Drawing Sheets

TIERED DISTRIBUTED LEDGER

BACKGROUND

Distributed ledgers or block chains are commonly used to record transactions, such as transactions in currency or other items. A distributed ledger is typically shared across multiple computing systems. The distributed ledger is made up of blocks, where each block includes block data. The data is subjected to cryptographic operations that validate the block data and tie different blocks to one another.

DRAWINGS

DETAILED DESCRIPTION

Figure 1:
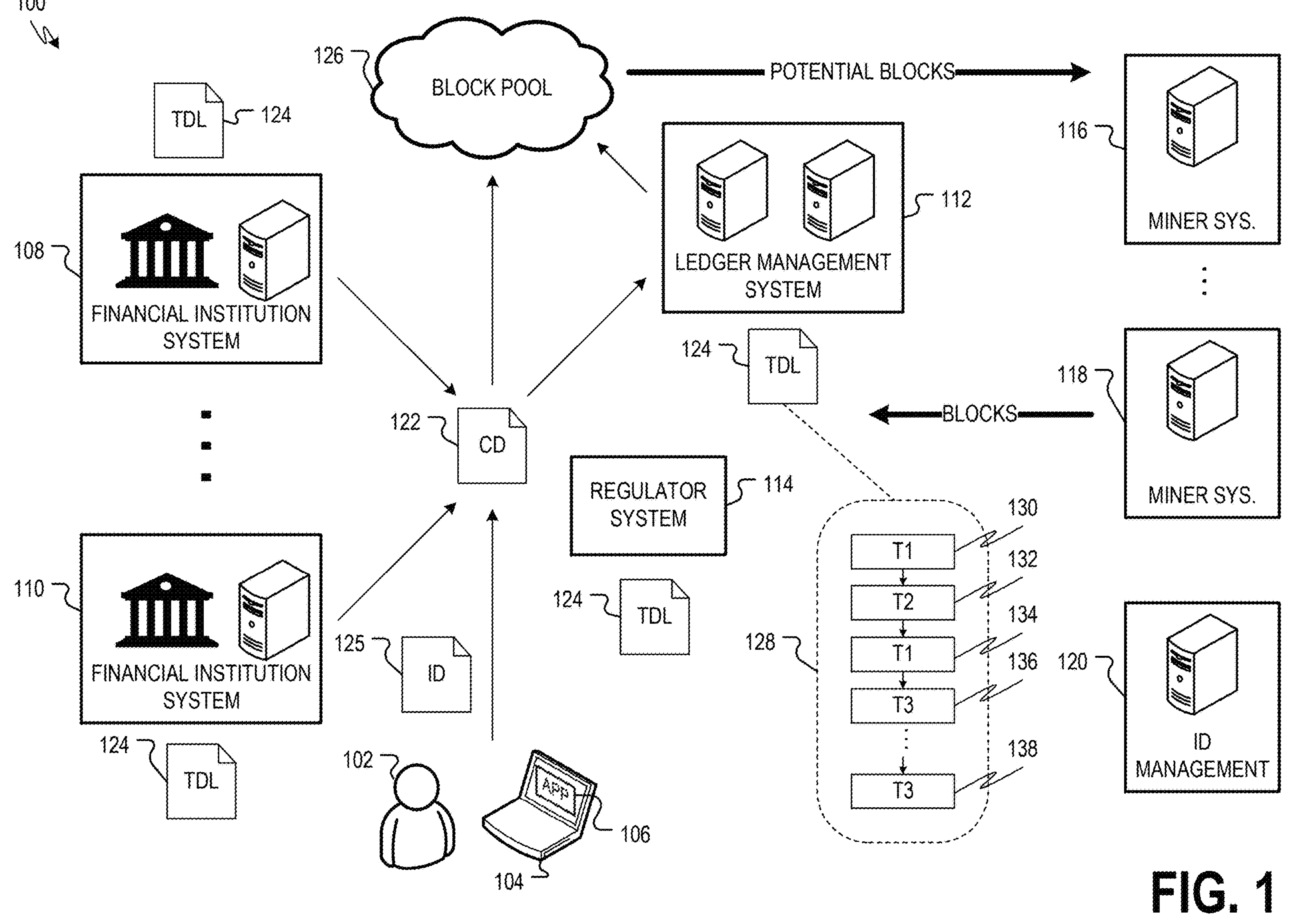
FIG. 1 is a diagram showing one example of an environment for implementing a tiered distributed ledger.

Various examples, financial institutions perform significant due diligence, for example, when onboarding new customers, executing financial transactions for customers, and/or the like. For example, when a potential customer approaches a financial institution, the financial institution will typically gather information about the potential customer. For potential customers who are individuals, this may include biographical information such as, for example, the customers address, employment history, and/or the like. For potential customers who are business entities, this may include information about ownership, business structure, assets, related entities, and/or the like.

Additional due diligence may be performed for some potential customers, for example, at onboarding and/or upon request for certain financial transactions. For example, if a customer or potential customer would like to perform wire transfers, the financial institution may query the customer about the purpose of the wire transfers. In some examples, due diligence may be performed according to Know Your Customer (KYC) guidelines and regulations applicable to the financial services industry.

In some examples, the financial institution also performs research about prior financial transactions of the customer or potential customer. Consider an example customer or potential customer requesting wire transfers. The financial institution may also perform research about prior wire transfers made by the customer. This may provide information about whether the customer or potential customer is using the requested transaction for improper purposes. For example, if the customer or potential customer has a history of wire transfers to a jurisdiction that is under sanctions, this may be a negative indicator for granting the customer future wire transfers.

It will be appreciated that performing due diligence for customers and potential customers can consume significant resources of the financial institution. Further, this work may be duplicated for customers who patronize more than one financial institution. For example, when a customer approaches a first financial institution, the first financial institution may perform various due diligence operations regarding the customer. If the customer then approaches a second financial institution, the second financial institution may also perform the same or similar due diligence operations with respect to the customer.

Computing technology may be used to automate and store the results of financial institution customer due diligence and make the stored results available to multiple different financial institutions. Attempting to utilize routine and conventional computing tools for this purpose, however, generates several challenges.

In some examples, due diligence data collected by various financial institutions may be stored to a block chain or other distributed ledger. In such an arrangement, due diligence data may be included in blocks of the distributed ledger. This arrangement, however, may present several challenges. For example, data stored at a distributed ledger, by its nature, may be available, and readable, by whoever is in possession of a copy of the distributed ledger. This may include various financial institution systems and, in some examples, may include other systems. Because some due diligence data may be confidential, this may be an undesirable arrangement. Also, for example, financial institutions who gather due diligence data about customers and potential customers may expend resources doing so. Writing such data to a publicly-available distributed ledger may not provide the financial institutions with sufficient compensation to make their participation cost-effective.

These and other challenges may be addressed utilizing a tiered distributed ledger in conjunction with a ledger management system. The tiered distributed ledger may include multiple tiers of blocks. Some or all of the blocks may comprise payload data that is encrypted utilizing a cryptographic key data. A financial institution system desiring to access an encrypted block of the distributed ledger may contact the ledger management system with an indication of the encrypted block. The ledger management system may verify that the financial institution system comprises sufficient rights to access the encrypted block. Provided that the financial institution system does have sufficient rights to access the encrypted block, the ledger management system may provide the financial institution with a cryptographic key data for decrypting the encrypted block. The financial institution system may use the cryptographic key data to decrypt the encrypted block and access the due diligence data contained therein.

In some examples, the tiered distributed ledger may include blocks at different tiers. For example, one or more tiers may include blocks that are "in the clear," or not encrypted. These blocks may include generally available customer data describing customers or potential customers such as, for example, biographical information, publicly available information, and/or the like. One or more additional tiers may include blocks that are encrypted and that may be decrypted with the assistance of the ledger management system. The tiers with encrypted blocks may store customer data that may not be publicly available such as, for example, due diligence research data and/or transaction data. This arrangement may facilitate the advantages of a distributed ledger including, for example, decentralization and ease of use of a distributed ledger, but without the disadvantages of universal public availability.

In addition to enhanced security, a tiered distributed ledger platform may provide greater system interoperability. For example, a tiered distributed ledger arrangement may allow a financial institution system to provide due diligence customer data to and receive the same from computing systems that may pose a greater security risk in more open distributed ledgers. A tiered distributed ledger platform may also facilitate more efficient data traceability across time. For example, records of access to one or more tiers may be kept by the financial institution or another party. This may facilitate the certification of how and when a particular institution met compliance requirements in onboarding.

Also, in some examples, a tiered distributed ledger platform may allow financial institutions to more securely share customer data such as, for example, customer data gathered and/or analyzed during due diligence. For example, different financial institutions may perform due diligence differently, resulting in different sets of customer data and/or different analysis. In some examples, the security offered by a tiered distributed ledger platform may facilitate the exchange of additional customer data, allowing financial institution due diligence to be more complete.

FIG. 1 is a diagram showing one example of an environment 100 for implementing a tiered distributed ledger 124. The environment 100 shows financial institution computing systems 108, 110 and a ledger management system 112. It will be appreciated that various implementations of the environment 100 may include more or fewer systems than are shown in FIG. 1. For example, the environment 100 may include more than two financial institution systems, more than one ledger management system, and/or the like.

In this example, the tiered distributed ledger 124 is used to store data describing customers and prospective customers of one or more financial institutions associated with the respective financial institution computing systems 108, 110. An example user 102 associated with a customer is shown. The user 102 may communicate with other portions of the environment 100 using a user computing device 104. The user computing device 104 may be any suitable computing device or devices such as, for example, a smart phone, a tablet computer, a laptop computer, a smart watch, and the like. The user computing device 104 may comprise input/output (I/O) devices for providing a user interface (UI) to the user 102. In some examples, user computing device 104 executes an application 106 that facilitates interaction with the other components of the environment 100. In some examples, the application 106 is a web browser that communicates with one or more of the other systems 108, 110, 112, 116, 118, 120 of the environment 100 via a web server or similar arrangement. In some examples, the user 102 provides unique identifier data describing a customer or potential customer associated with the user. The financial institution system 108, 110 and/or regulator system 114 may utilize unique identifier data 125 received from the user 102 to identify one or more blocks of the tiered distributed ledger 124 including customer data describing the customer or potential customer represented by the user 102. The customer data may include, for example, information about potential customers, including information gathered during due diligence, analysis of information about potential customers, and/or the like.

Financial institution systems 108, 110 may be implemented by financial institutions such as, for example, commercial banks, investment banks, issuers of credit cards or other similar financial instruments, and/or the like. The financial institution systems 108, 110 may comprise one or more computing devices, such as servers and/or the like. A single financial institution system 108, 110 may be implemented at a single geographic location and/or across multiple geographic locations. In some examples, a financial institution may implement a financial institution system 108, 110 in whole or in part using a cloud deployment such as infrastructure as a service (IaaS), platform as a service (PaaS) or similar arrangement.

The ledger management system 112 may be implemented by an entity that acts as a manager for the tiered distributed ledger 124. For example, the entity implementing the ledger management system 112 may be a financial institution, a consortium of financial institutions, and/or the like. The ledger management system 112 may comprise one or more computing devices, such as servers and/or the like. The ledger management system 112 may be implemented at a single geographic location and/or across multiple geographic locations. Also, although only one ledger management system 112 is shown in FIG. 1, it will be appreciated that the tiered distributed ledger 124, as described herein, may be managed by multiple different ledger management systems 112. For example, different ledger management systems 112 may manage different tiers of the tiered distributed ledger 124.

A regulator system 114 may be a computing system implemented by a public agency or other financial regulator. A regulator entity may utilize the regulator system 114 to access the tiered distributed ledger 124. The regulator entity may examine the tiered distributed ledger, for example, to identify transactions and/or other potentially regulated behavior by one or more financial institutions and/or customers thereof. The regulator system 114 may comprise one or more computing devices, such as servers and/or the like. The regulator system 114 may be implemented at a single geographic location and/or across multiple geographic locations. Also, although only one regulator system 114 is shown in FIG. 1, it will be appreciated that the environment 100 may include multiple regulator systems such as the regulator system 114. For example, different public entities for different jurisdictions may implement regulator systems similar to the regulator system 114.

The tiered distributed ledger 124 may be used to store customer data describing customers or potential customers of the financial institutions. An example diagram 128 of the tiered distributed ledger 124 indicates blocks 130, 132, 134, 136, 138. Each block 130, 132, 134, 136, 138 is associated with a tier, where the tier of a block describes the data that is stored in the block and an encryption status of the block, if any. In this example, three tiers are shown. For example, blocks 130 and 134 are tier 1 blocks. Block 132 is a tier 2 block. Blocks 136, 138 are tier 3 blocks.

Customer data stored at the tiered distributed ledger 124 may be generated by financial institutions associated with the financial institution systems 108. When a financial institution generates customer data 122 describing a customer or prospective customer, the financial institution, using its associated financial institution system 108, 110 may provide the customer data 122 to the ledger management system 112. In some examples, the financial institution system 108, 110 cryptographically signs the customer data 122 to verify the identity of the financial institution providing the customer data 122. The financial institution system 108, 110 may provide a unique identifier of the customer or potential customer with the customer data 122. The unique identifier may be any identifier that may uniquely identify an individual customer or customer or entity. In some examples, the unique identifier is or includes a Legal Entity Identifier (LEI).

The ledger management system 112 may receive the customer data 122 and determine whether the customer data has been received from an entity that is authorized to write to the tiered distributed ledger 124. If the ledger management system 112 determines that the customer data 122 was received from a financial institution that is authorized to write to the tiered distributed ledger 124, it may determine a tier associated with the customer data 122. In some examples, the financial institution system 108, 110 may include tier data with the customer data 122. The tier data may describe a tier to which the customer data is to be written. In some examples, the ledger management system 112 may determine the tier level of customer data 122 based on the customer data 122. If the tier level for the customer data 122 corresponds to a tier that is to be encrypted, the ledger management system 112 may encrypt the customer data 122 using one or more cryptographic keys.

Customer data 122 may be recorded at the tiered distributed ledger 124 as a block and/or as part of a block. In some examples, the financial institution system 108, 110 digitally signs customer data 122 to form a potential block. Accordingly, the customer data 122 is provided to the ledger management system 112 as a potential block. In other examples, the ledger management system 112 digitally signs customer data 122 to form a potential block upon verifying that the financial institution associated with the financial institution system 108, 110 is authorized to write to the tiered distributed ledger 124. In some examples, the ledger management system 112 consolidates customer data describing multiple different customers and/or received from multiple different financial institution systems 108, 110 into a common potential block. In some examples, the cryptographic signature for a block or potential block is generated considering data from a prior transaction at the tiered distributed ledger 124 so as to set an order of blocks. After a potential block is digitally signed, it may be broadcast to other systems 108, 110, 112, 114 that maintain copies of the tiered distributed ledger 124.

In some examples, broadcasting a potential block of the tiered distributed ledger 124 includes providing the potential block to a block pool 126. The block pool 126 may be maintained by one or more of the systems 108, 110, 112, 114, and/or devices 104 that are parties to the tiered distributed ledger 124 and/or may be implemented by one or more other systems, such as by one or more miner systems 116, 118. In some examples, broadcasting may be performed utilizing a broadcasting circuit. The broadcasting circuit may be a component of the system 108, 110, 112, 114, 116, 118, 120 performing the broadcast and may be used by the respective system to communicate the potential block or other data to other respective systems. In some examples, a broadcasting circuit includes a network interface device or other similar suitable hardware.

Miner systems 116, 118 may generate blocks for the tiered distributed ledger 124 using potential blocks from the block pool 126. A miner system 116, 118 may include any suitable computing device or devices such as, for example, one or more desktop computers, one or more laptop computers, one or more servers, and the like. In some examples, a miner system 116, 118 includes specialized hardware for quickly performing cryptographic functions such as, for example, high speed graphics processing units (GPUs), an Application Specific Integrated Circuit (ASIC) optimized for cryptographic operations, and/or the like.

A block generated by a miner system 116, 118 may include customer data generated by one or more of the financial institution systems 108, 110 and a unique identifier of the customer. If the block is part of a tier in which data is to be encrypted, the customer data included in the block may be encrypted and, therefore, unreadable to those who do not possess the proper cryptographic key data. On the other hand, if the block is part of the tier in which data is unencrypted or in the clear, the customer data may not be encrypted. For example, although blocks of the tiered distributed ledger 124 may be digitally signed, as described herein, the customer data incorporated into blocks that are unencrypted or in the clear may be readable by parties in possession of the tiered distributed ledger 124. A miner system 116, 118 may digitally sign the block of transaction records. In some examples, the miner system's cryptographic signature may be determined based on content from a prior block at the tiered distributed ledger 124 (e.g., the most recent block added to the tiered distributed ledger 124).

In addition to digitally signing a block, the miner systems 116, 118 may generate a proof-of-work for the block. The proof-of-work for the block may involve performing a cryptographic operation that takes time to complete. In some examples, the proof-of-work may involve adding nonce data to all or a portion of the block such that the cryptographic signature of the block has a predetermined property (e.g., a predetermined number of leading zeros, and/or the like). It may not be practical to deterministically generate the proof-of-work, so the miner systems 116, 118 may repeatedly test nonce data with the cryptographic function used to generate the cryptographic signature until nonce data is found that, when used with the cryptographic function of the cryptographic signature, generates a cryptographic signature having the predetermined properties.

The first miner system 116, 118 to generate a cryptographic signature having the predetermined properties may broadcast its version of the block, including the cryptographic signature or other proof-of-work, to the parties to the tiered distributed ledger 124. The parties may add the newly received block to the tiered distributed ledger 124. In some examples, the tiered distributed ledger 124 may be implemented with rules for resolving block conflicts. For example, if two miner systems 116, 118 solve a block at or near the same time, some of the parties to the tiered distributed ledger 124 may first receive a new block generated by miner system 116 while other parties may first receive a new block generated by miner system 118. In such a case, for example, the parties to the tiered distributed ledger 124 may accept as accurate the block chain branch having the most blocks.

A miner system 116, 118 that successfully generates a block may be compensated by the other parties to the tiered distributed ledger 124. For example, the parties who requested the transaction records included in a block may pay a transaction charge to the miner system 116, 118 when a block is completed.

Financial institution systems 108, 110, regulators system 114, and/or other parties may utilize the tiered distributed ledger 124 to retrieve customer data. For example, a potential customer may approach a financial institution associated with the financial institution system 108 desiring to purchase a financial product or service. The financial institution system 108 may receive unique identifier data for the potential customer. The financial institution system 108 may use the unique identifier data for the potential customer to identify one or more blocks at the tiered distributed ledger 124 comprising customer information about the potential customer. For blocks that are part of an unencrypted or clear tier of the tiered distributed ledger 124, the financial institution system 108 may read the customer data and utilize it to verify the identity of the potential customer and receive other customer information. In some examples, the financial institution system 108 may verify the block to ensure that it is properly a part of the tiered distributed ledger. This may include, for example, recalculating a cryptographic signature of the block in view of the content of one or more other blocks in the tiered distributed ledger 124.

If the tiered distributed ledger comprises encrypted-tier blocks describing the potential customer (e.g. as indicated by the unique customer identifier data), the financial institution system 108 may query the ledger management system 112 to facilitate decryption. The ledger management system 112 may determine if the financial institution system 108 is authorized to decrypt the block or blocks. In some examples, the financial institution system 108 may be authorized if it institutes a payment transaction for access and/or if the financial institution system 108 possesses a subscription to the appropriate tier. The ledger management system 112 may provide cryptographic key data to the financial institution system 108. Financial institution system 108 may utilize the cryptographic key data to decrypt customer data from the appropriate block or blocks. Any suitable cryptographic key data or cryptographic technique may be used such as, for example, Rivest-Shamir-Adleman (RSA) or another suitable public-key crypto system.

In some examples, the financial institution system 108 provides the encrypted block and/or an indication of it to the ledger management system 112. The ledger management system 112 may decrypt the customer data at the indicated block or blocks and provide the decrypted block or blocks to the financial institution system 108. In some examples, the decrypted block or blocks are transmitted to the financial institution system 108 utilizing a secure communication session. For example, the ledger management system 112 may encrypt the block data before sending it to the financial institution system according to the secure communication session. The financial institution system 108 may utilize cryptographic key data to decrypt the block data according to the secure communication session.

In various examples, an identity management system 120 may be used to track the identity of participants in the tiered distributed ledger 124 such as, for example, financial institution systems 108, 110, the regulator system 114, and one or more users associated with customers, such as user 102. The identity management system 120 may be implemented using any suitable computing device or devices such as, for example, one or more services at a single location and/or distributed at multiple geographic locations. The identity management system 120 may be implemented using an on-premise arrangement and/or using a cloud deployment such as according to IaaS, PaaS, or a similar arrangement.

In some examples, an entity implementing one or more of the computing devices or systems 108, 110, 112 may prove its identity to the identity management system 120, for example, by providing identifying information to the identity management system 120 and/or an identity management entity associated with the identity management system 120. Identifying information provided by a plan participant to the identity management system 120 may include, for example, a name, previous names, an address, a Social Security number or other government identification number, a date of birth, etc. In some examples, an entity may provide documents to the identity management system 120 such as, for example, a birth certificate, a Social Security card, driver's license, or other government-issued identification. In some examples, a user provides the identity management system 120 (and/or the implementing identity management entity) with hard copies of one or more identity-proving documents.

When a party has proven its identity to the identity management system 120, the identity management system 120 may store a public verification key for the party. In some examples, the party (or a computing system thereof) generates the public verification key and provides it to the identity management system 120, which may store the public verification key. In other examples, the identity management system 120 may generate a public/private key pair for the party and store the public verification key in association with identity information describing the user 102. In some examples, the identity management system 120 may also store unique identifier data associated with a particular customer or potential customer.

When a financial institution system 108, 110 or regulator system 114 is to demonstrate its authorization to either read to or right from the tiered distributed ledger, it may provide identifying information to the ledger management system 108. The identity management system 120 may determine whether it has stored identity information for the financial institution system 108, 110 or regulator system 114 previously. If the identity management system 120 already has a public verification key stored in association with financial institution system 108, 110 or regulator system 114, the identity management system 120 may provide the public verification key to the ledger management system 112. The plan sponsor system 108 may use the public verification key to verify that the financial institution system 108, 110 or regulator system 114 is authorized to write to the tiered distributed ledger and/or read encrypted tier blocks from the tiered distributed ledger 124.

In some examples, customers, via customer users 102, may similarly use the identity management system 120. For example, the user 102 may provide identity information describing the user 102 and/or a customer entity associated with the user 102 to a financial institution system 108, 110. The financial institution system 108, 110 may provide the identifying information to the identity management system 120.

The identity management system 120 may determine whether it has stored identity information for the user 102 or customer associated therewith previously. For example, if the user 102 or customer associated therewith has a demand deposit account opened through a different commercial bank, then the identity management system 120 may already have a public verification key stored for the user 102 or customer associated therewith. If the identity management system 120 already has a public verification key stored in association with the user 102 or customer associated therewith, the identity management system 120 may provide the public verification key to the account sponsor system 108. The account sponsor system 108 may use the public verification key for transactions involving the user 102 or customer associated therewith. If the identity management system 120 does not have a public verification key stored in association with the user 102 or customer associated therewith, the user 102 or customer associated therewith may be prompted to generate and/or store a public verification key at the identity management system 120, as described herein. The identity management system 120 may provide the public verification key to the plan sponsor system 108, which may use the public verification key for transactions involving the user 102 or customer associated therewith.

Figure 2:
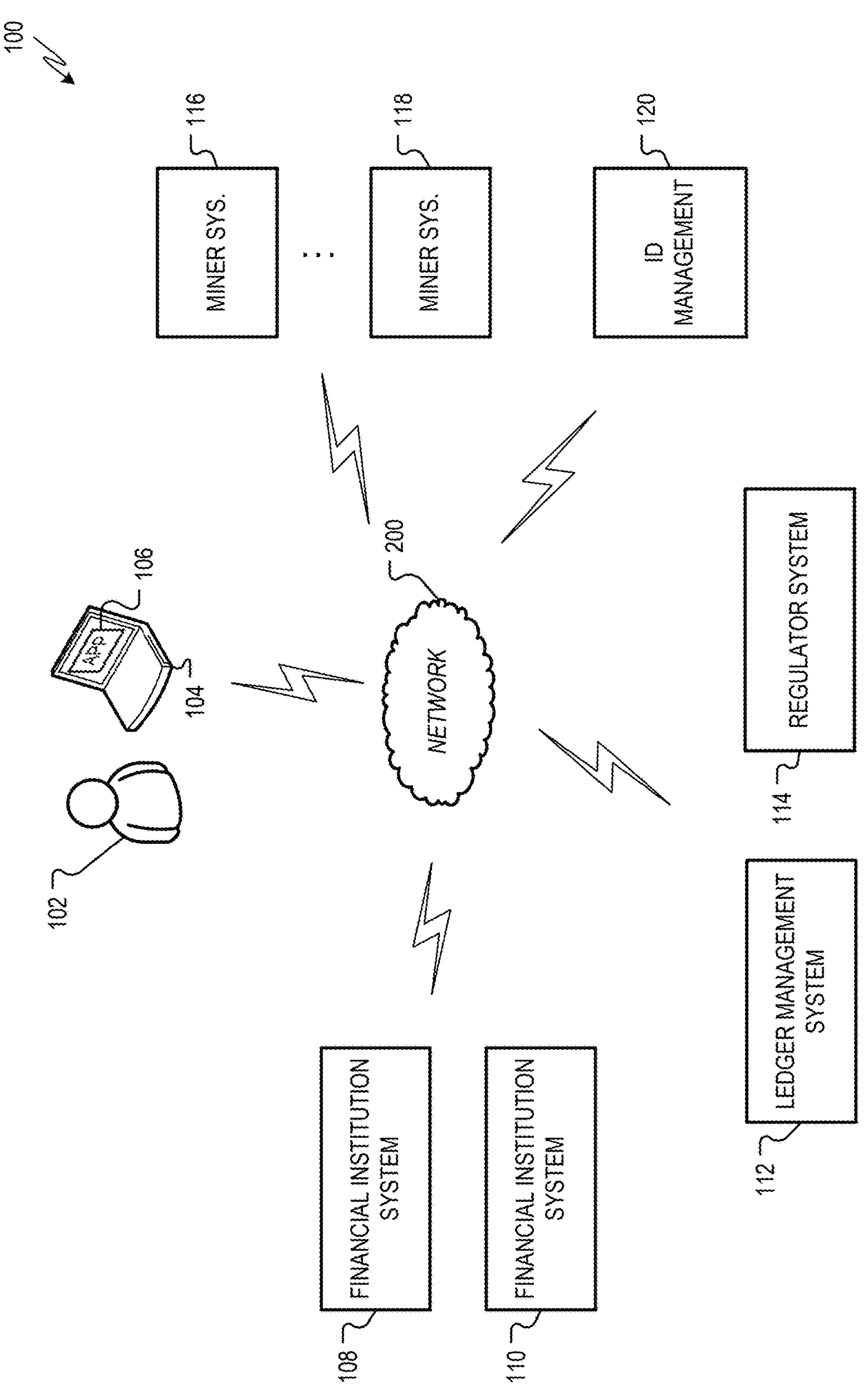
FIG. 2 is a diagram showing another example of the environment including additional details.

FIG. 2 is a diagram showing another example of the environment 100 including additional details. In the example of FIG. 2, the financial institution systems 108, 110, ledger management system 112, regulator system 114, miner systems 116, 118, identity management system 120 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, a combination of two or more such networks, and so forth.

Figure 3:
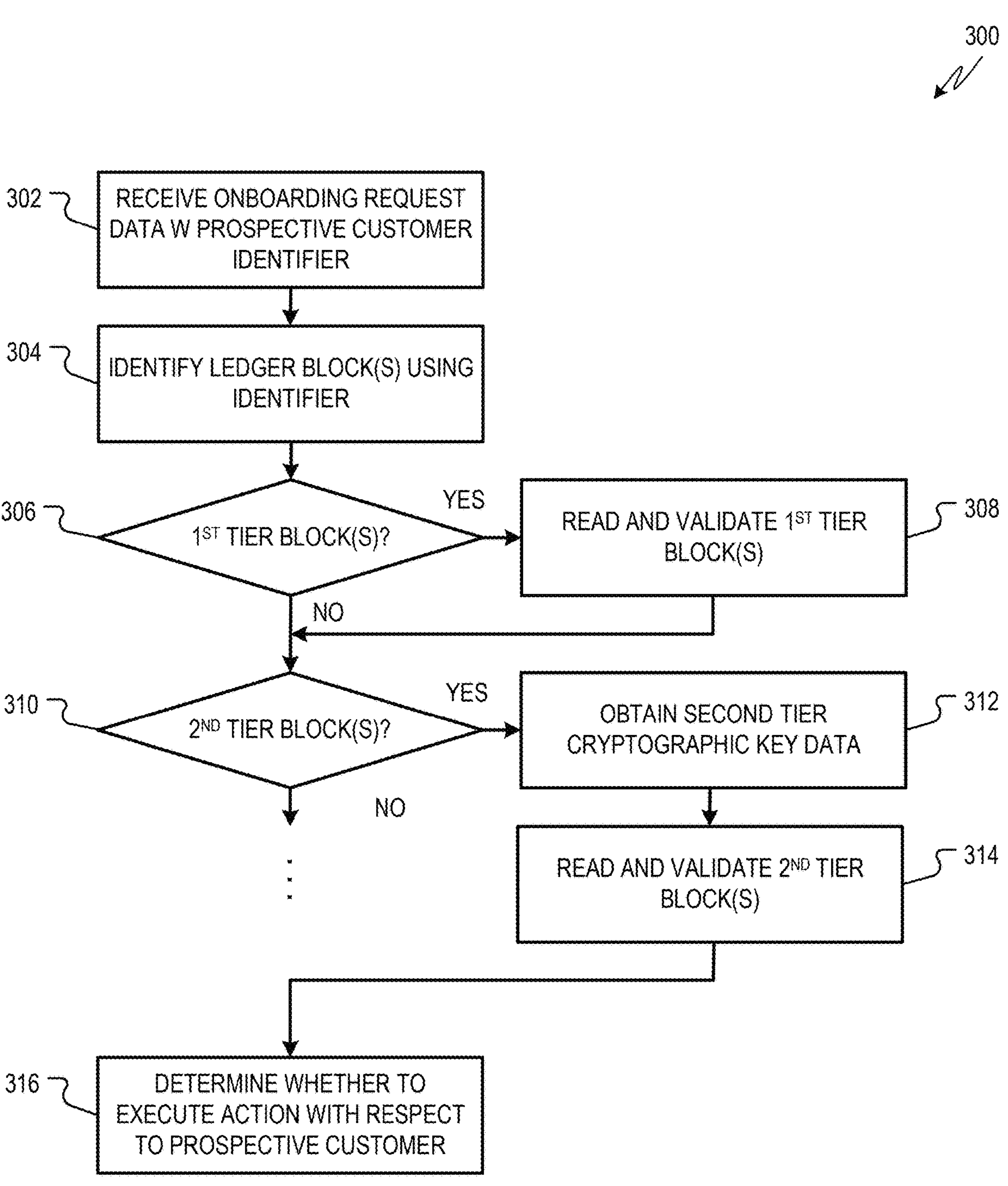
FIG. 3 is a flowchart showing one example of a process flow that may be executed in the environment of FIG. 1 by a financial institution system to access customer data at the tiered distributed ledger.

FIG. 3 is a flowchart showing one example of a process flow 300 that may be executed in the environment 100 of FIG. 1 by a financial institution system, such as financial institution system 108, 110, to access customer data at the tiered distributed ledger 124. Although the process flow 300 is described as performed by a financial institution system, it will be appreciated that the process flow 300 may be performed by other suitable system such as, for example, the regulator system 114. For example, a regulator system 114 may execute process flow 300 to obtain customer data stored at the tiered distributed ledger 124 for regulatory compliance or other suitable reasons.

At operation 302, the financial institution system may access onboarding request data from a potential customer. The onboarding request data onboarding request data describing the potential customer. In some examples, the onboarding request data is received from a user, such as the user 102. The onboarding request data may comprise unique identifier data describing the potential customer.

At operation 304, the financial institution system identifies one or more blocks of the tiered distributed ledger 124 including customer data describing the potential customer. For example, the financial institution system may identify one or more blocks of the tiered distributed ledger that include the unique identifier data. In some examples, blocks of the tiered distributed ledger 124 may include the unique identifier data for a customer or customers described by customer data stored at the block. The unique identifier data may be unencrypted or in the clear, thus allowing the financial institution system to determine the customer or customers referenced by a block without decrypting the customer data in the block. In this way, the financial institution system may not need to decrypt each and every block of the tiered distributed ledger 124 in order to identify blocks with customer data describing a particular customer. Operation 304 may result in a set of one or more blocks of the tiered distributed ledger 124 that include customer data describing the potential customer. In some examples, the tiered distributed ledger 124 does not include any blocks describing the potential customer. If this occurs, the process flow 300 may end after operation 304.

Provided that at least one block at the tiered distributed ledger 124 includes customer data describing the potential customer, the financial institution system may determine, at operation 306, if the set of blocks describing the potential customer include any first-tier blocks. If any first-tier blocks are indicated, the financial institution system may read and validate the first-tier blocks at operation 308. Reading a block may include accessing the customer data stored in the block. In this example, customer data stored in first-tier blocks is unencrypted or in the clear. Validating the block may include re-creating the cryptographic signature of the block in view of the contents of the block (e.g., including the customer data) and the contents of one or more prior blocks in the tiered distributed ledger. If the re-created cryptographic signature matches the cryptographic signature included with the first-tier block, then the first-tier block may be validated.

After first-tier blocks are read and validated at operation 308, or if there are no first-tier blocks at operation 306, the financial institution system may determine at operation 310 if any second-tier blocks including customer data about the potential customer were identified at operation 304. In this example, second-tier blocks include customer data that is encrypted. If one or more second-tier blocks were identified, the financial institution system may, at operation 312, obtain second-tier cryptographic key data. This may include, for example, querying the ledger management system 112 to obtain the second-tier cryptographic key data. In some examples, the financial institution system may initiate a payment transaction to the ledger management system 112 as compensation for accessing the second-tier block. The cryptographic key data received from the ledger management system 112 may be or include a static key, a dynamic key, and/or the like. In some examples, the financial institution provides a reference to the identified second-tier blocks or blocks. The ledger management system 112 may decrypt customer data at the identified second-tier blocks or blocks and provide the decrypted customer data to the requesting financial institution system via a secured, encrypted communication session, as described herein.

At operation 314, the financial institution system may read and validate the second-tier blocks or blocks. For example, the financial institution system may read second-tier blocks by decrypting customer data included at the second-tier blocks using the second-tier cryptographic key data obtained from the ledger management system 112. The financial institution system may validate second-tier blocks by re-creating cryptographic signature data for the blocks, for example, as described herein.

If there are additional tears of the tiered distributed ledger 124, the financial institution system may proceed to read identified blocks from the additional tears, for example, in a manner similar to that described for the first-tier blocks and/or the second-tier blocks. When customer data from all blocks pertaining to the potential customer is read, the financial institution system may, at operation 316, determine whether to execute an action with respect to the prospective customer. The action may include, for example, completing an onboarding of the potential customer. The determination of whether to perform the action may be based on the customer data identified from the one or more blocks of the tiered distributed ledger 124 that are associated with the potential customer.

Also, although the process flow 300 as described with respect to a potential customer, it will be appreciated that the process flow 300 may also be described with respect to an existing customer of the financial institution. For example, the financial institution system may execute the process flow 300 with respect to an existing customer as part of a regular customer review, as a component of determining whether to provide an additional transaction or financial product to the customer, and/or the like.

Figure 4:
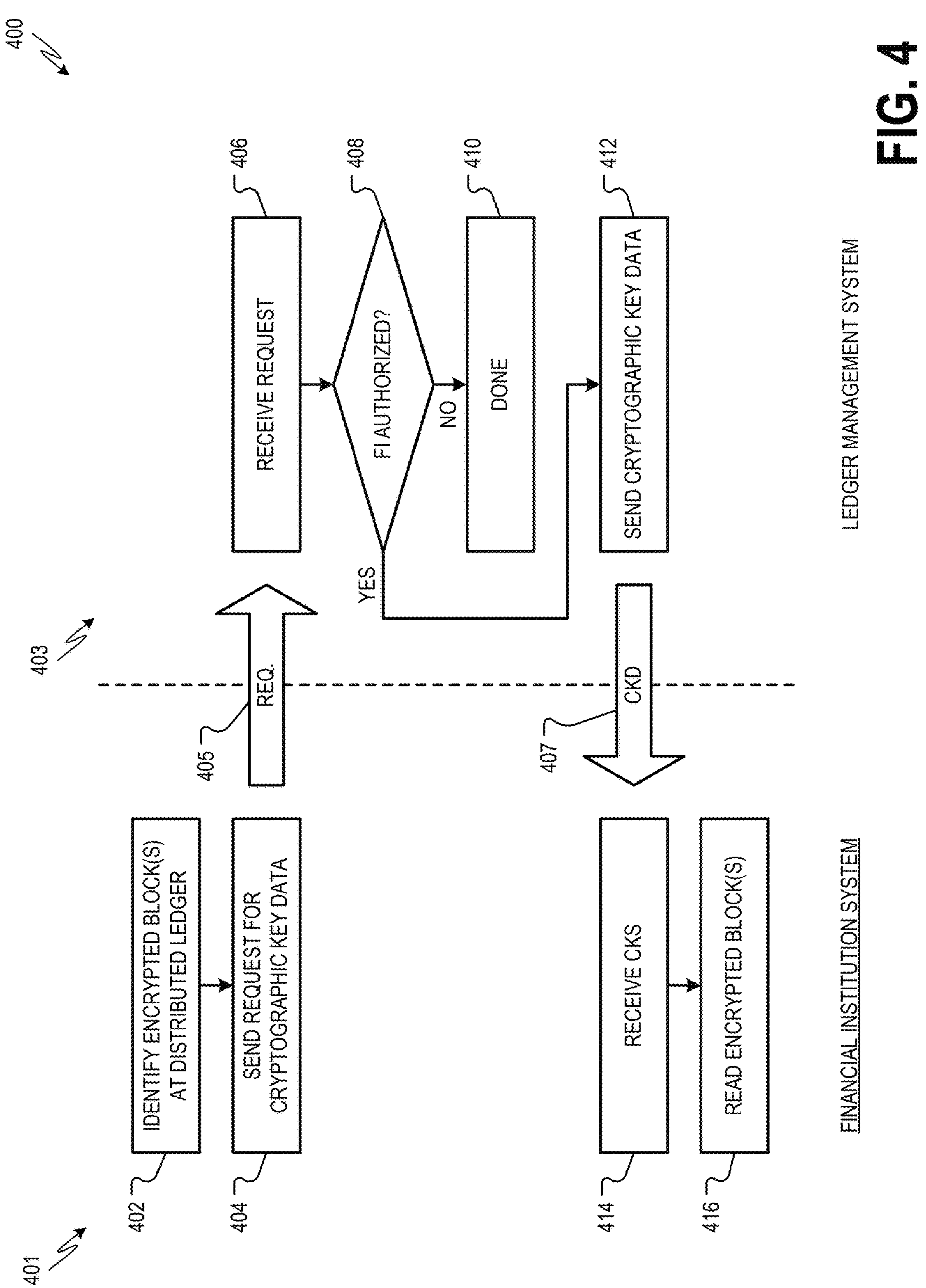
FIG. 4 is a flowchart showing one example of a process flow that may be executed in the environment of FIG. 1 to provide access to encrypted customer data at one or more encrypted-tier blocks of the tiered distributed ledger.

FIG. 4 is a flowchart showing one example of a process flow 400 that may be executed in the environment 100 of FIG. 1 to provide access to encrypted customer data at one or more encrypted-tier blocks of the tiered distributed ledger 124. The process flow 400 comprises a column 401 including operations that may be performed by a financial institution system 108, 110 and a column 403 including operations that may be performed by the ledger management system 112. Also, in various examples, the operations performed by the financial institution system may be performed, instead, by a regulator system 114.

At operation 402, the financial institution system may identify one or more encrypted blocks at the tiered distributed ledger 124. For example, the financial institution system may identify one or more blocks at the tiered distributed ledger 124 that are of a tier that includes encrypted customer data. At operation 404, the financial institution system may send a request 405 for cryptographic key data to the ledger management system 112. In some examples, the request includes an indication of one or more blocks from the tiered distributed ledger that the financial institution system is to read.

The ledger management system 112 may receive the request at operation 406. At operation 408, the ledger management system 112 may determine if the financial institution system making the request 405 is authorized to access the indicated blocks or blocks of the tiered distributed ledger 124. For example, the ledger management system 112 may determine if the financial institution system has initiated an appropriate payment transaction in return for access. In some examples, the ledger management system 112 may determine if the financial institution system holds a suitable subscription providing the financial institution system with access to the appropriate tier or tiers of the tiered distributed ledger 124. If the financial institution system is not authorized to access the block or blocks indicated by the request for a five, the process flow 400 may end at operation 410. In some examples, the ledger management system 112 may send a denial message to the financial institution system indicating that the request 405 has been denied.

If the financial institution system is authorized to access the block or blocks indicated by the request 405, the ledger management system 112 may, at operation 412, send cryptographic key data 407 Fort decrypting the encrypted customer data at the block or blocks to the financial institution system. The financial institution system may receive the cryptographic key data for a seven at operation 414 and utilize the cryptographic key data 407 to read the encrypted blocks or blocks at operation 416.

Figure 5:
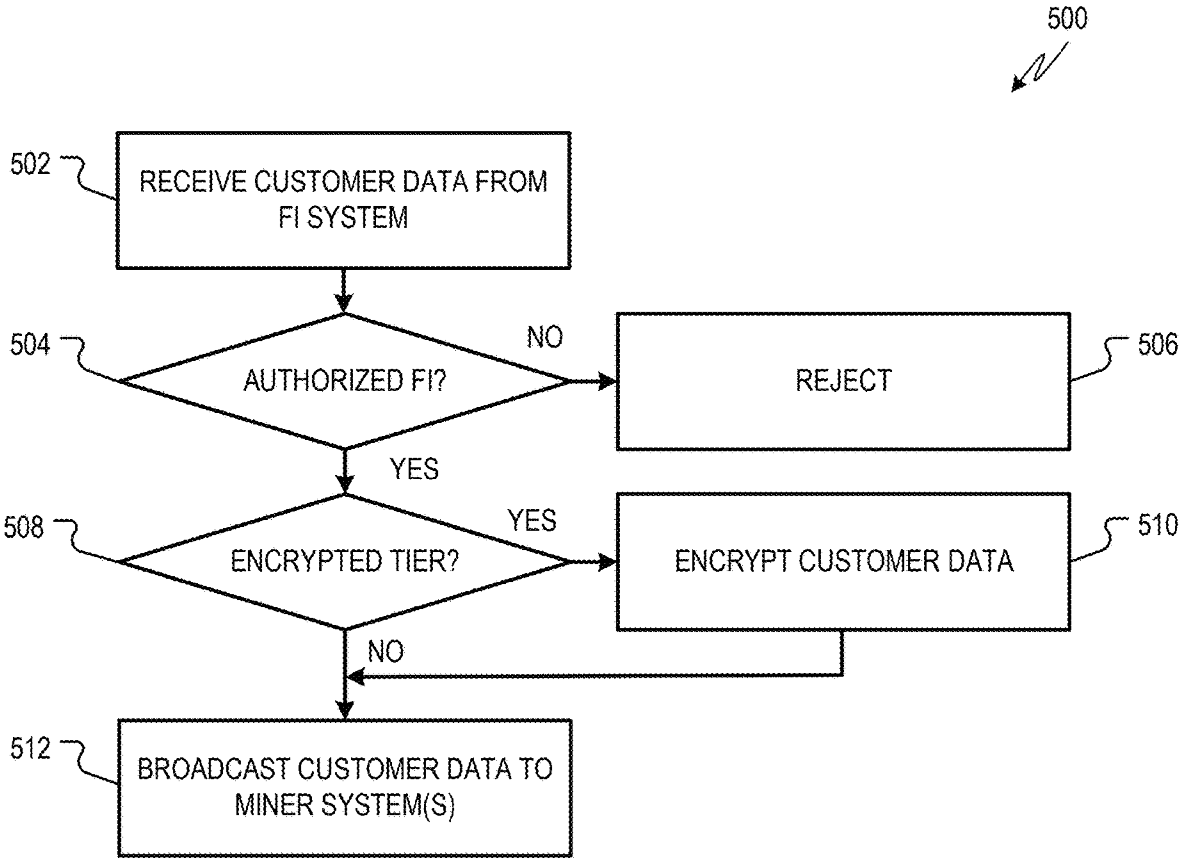
FIG. 5 is a flowchart showing one example of a process flow that may be executed in the environment of FIG. 1 to add customer data to the tiered distributed ledger.

FIG. 5 is a flowchart showing one example of a process flow 500 that may be executed in the environment 100 of FIG. 1 to add customer data to the tiered distributed ledger 124. At operation 502, the ledger management system 112 may receive customer data from a financial institution system. The customer data may include customer data that was gathered by a financial institution associated with the financial institution system, for example, pursuant to due diligence or other data gathering associated with a customer or potential customer. The customer data may include unique identifier data describing the customer. If the customer data describes more than one customer, it may include unique identifier data associated with each described customer.

At operation 504, the ledger management system 112 may determine if the financial institution system from which the customer data was received is authorized to write to the tiered distributed ledger 124. For example, the financial institution system may have verified its identity to the identity management system 120 and may include a cryptographic signature generated with a private key associated with financial institution system or a financial institution implementing the financial institution system. The ledger management system 112 may obtain the public key associated with the financial institution system to verify the cryptographic signature. The ledger management system, upon verifying the identity of the financial institution system, may determine if the financial institution system possesses rights to write to the tiered distributed ledger 124.

If the financial institution system lacks rights to write to the tiered distributed ledger 124, the ledger management system 112 may reject the received customer data at operation 506. If the financial institution system is authorized to write the customer data to the tiered distributed ledger 124, then the ledger management system 112 may determine, at operation 508, whether the received customer data is to be included in an encrypted tier of the tiered distributed ledger 124. If the customer data is to be included in an encrypted tier of the tiered distributed ledger 124, then the ledger management system 112 may encrypt the customer data at operation 510. After incrementing the customer data and/or if the customer data is not to be part of an encrypted tier, the ledger management system 112 may broadcast the customer data to one or more miner systems 116, 118 at operation 512. This may include broadcasting the customer data and/or a block including the customer data, to the block pool 126.

Figure 6:
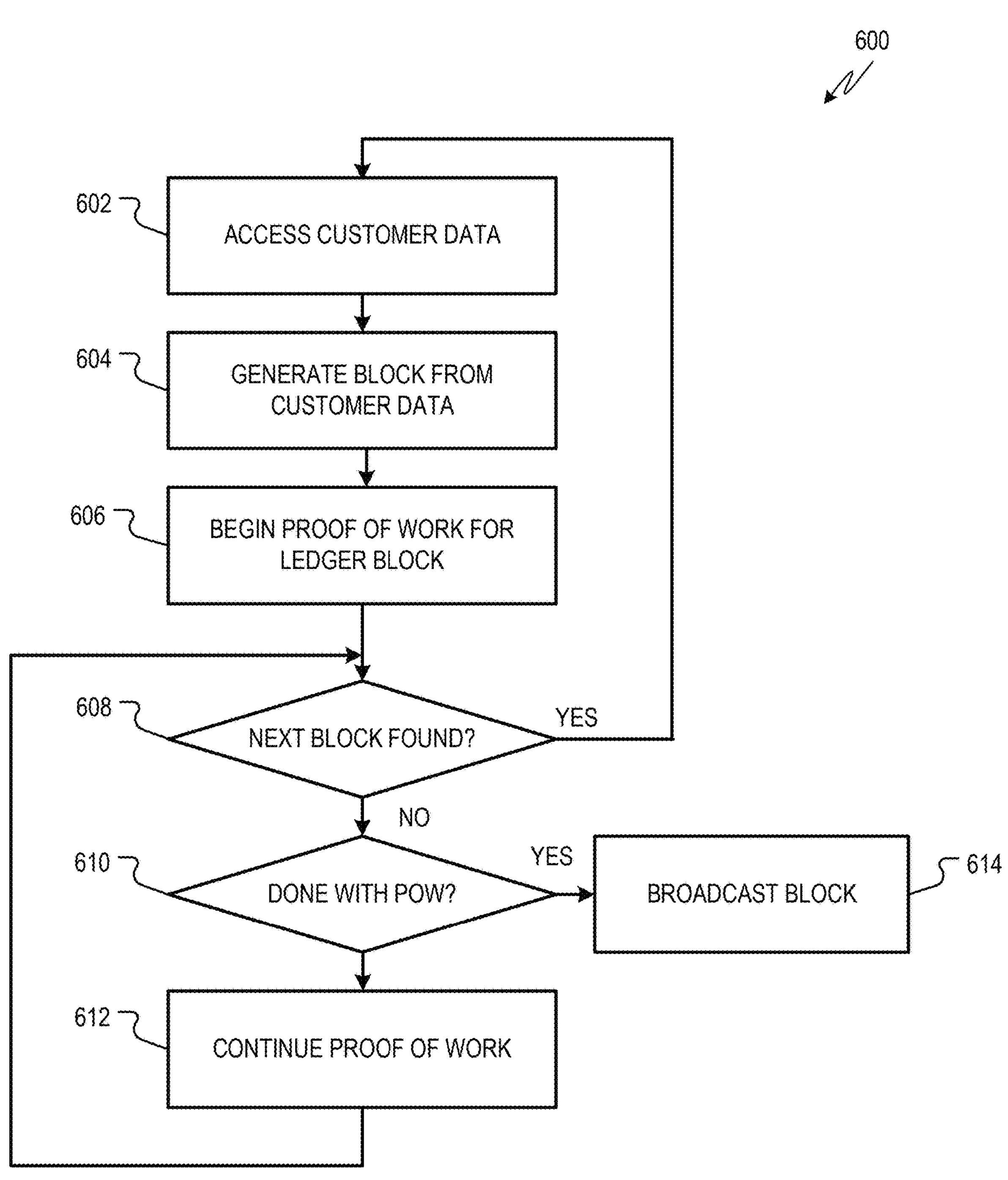
FIG. 6 is a flowchart showing one example of a process flow that may be executed by a miner system to generate blocks for incorporation into the tiered distributed ledger.

FIG. 6 is a flowchart showing one example of a process flow 600 that may be executed by a miner system 116, 118 to generate blocks for incorporation into the tiered distributed ledger 124. In this example, the process flow 600 is described as being implemented by the miner system 116. In practice, however, the process flow 600 may be executed in parallel by multiple miner systems 116, 118. The process flow 600 describes an example in which the financial institution system and/or ledger management system rights customer data to the block pool 126 without first formatting the customer data as a block.

At operation 602, the miner system 116 accesses customer data from the block pool 126. The miner system 116 may select the customer data in any suitable manner. In some examples, the miner system 116 accesses customer data associated with a single customer and that is to be included in a common tier. At operation 604, the miner system 116 generates a block using the set of transaction records. This may include, for example, cryptographically signing the customer data accessed at operation 602. The cryptographic signature may be based on the contents of a latest completed block of the tiered distributed ledger 124.

At operation 606, the miner system 116 begins a proof-of-work for the block. The proof-of-work may include, for example, generating a cryptographic signature of the set of transaction records that meets a predetermined property (e.g., beginning with a predetermined number of leading zeros). While determining the proof-of-work, the miner system 116 may determine, at operation 608 whether the next block of the tiered distributed ledger 124 has been found and broadcast by another miner system 118. If the next block has been found, the miner system 116 may return to operation 602 and access a next set of transaction records to generate a next block.

If the next block has not yet been found at operation 608, the miner system 116 may determine, at operation 610, whether it has completed the proof-of-work for the block being generated. If not, the miner system 116 may continue to generate the proof-of-work at operation 612 and periodically re-execute operations 608 and 610. If the miner system 116 has completed the proof-of-work at operation 610, it may, at operation 614, broadcast its block including the proof-of-work, to the parties to the tiered distributed ledger 124. Upon broadcasting a block, the miner system 116 may return to operation 602 to work on a next block.

Figure 7:
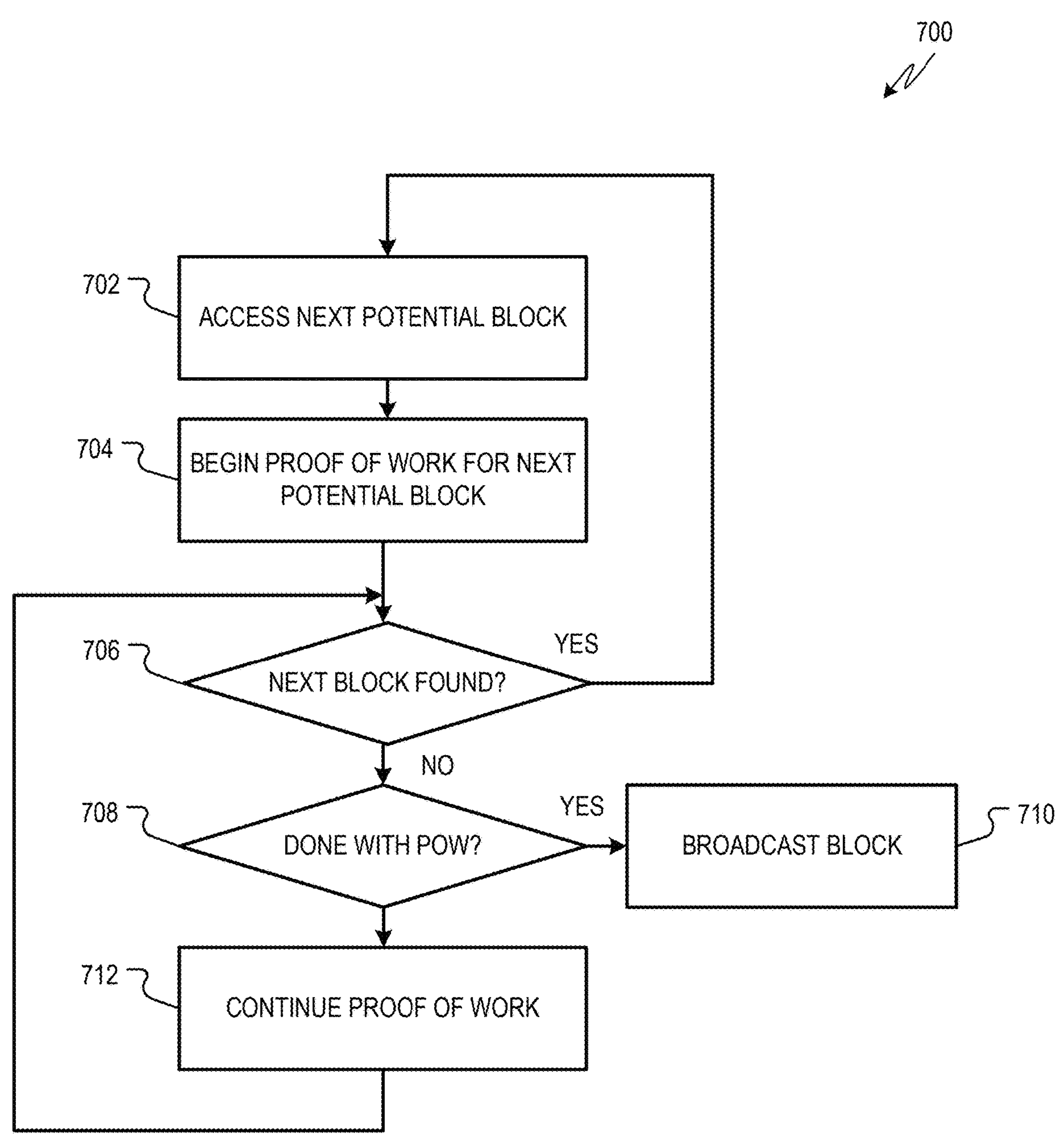
FIG. 7 is a flowchart showing another example of a process flow that may be executed by a miner system to generate blocks for incorporation into the tiered distributed ledger.

FIG. 7 is a flowchart showing another example of a process flow 700 that may be executed by a miner system 116, 118 to generate blocks for incorporation into the tiered distributed ledger 124. In this example, the process flow 700 is described as being implemented by the miner system 116. In practice, however, the process flow 700 may be executed in parallel by multiple miner systems 116, 118. The process flow 700 describes an arrangement where the financial institution system and/or the ledger management system 112 formats customer data into potential blocks and then writes the potential blocks to the block pool 126. The potential blocks at the block pool 126 may be suitable for adding to the tiered distributed ledger 124 but for the proof of work generated by a miner system 116, 118.

At operation 702, the miner system 116 accesses a potential blocks from the block pool 126. At operation 704, the miner system 116 begins a proof-of-work for the block. The proof-of-work may include, for example, generating a cryptographic signature of the set of transaction records that meets a predetermined property (e.g., beginning with a predetermined number of leading zeros). While determining the proof-of-work, the miner system 116 may determine, at operation 706 whether the next block of the tiered distributed ledger 124 has been found and broadcast by another miner system 118. If the next block has been found, the miner system 116 may return to operation 702 and access a next potential block.

If the next block has not yet been found at operation 706, the miner system 116 may determine, at operation 708, whether it has completed the proof-of-work for the block being generated. If not, the miner system 116 may continue to generate the proof-of-work at operation 712 and periodically re-execute operations 706 and 708. If the miner system 116 has completed the proof-of-work at operation 708, it may, at operation 710, broadcast its block including the proof-of-work, to the parties to the tiered distributed ledger 124. Upon broadcasting a block, the miner system 116 may return to operation 702 to work on a next block.

EXAMPLES

In view of the disclosure above, various examples are set forth below. It should be noted that one or more features of an example, taken in isolation or combination, should be considered within the disclosure of this application.

Example 1 is a system for using a tiered distributed ledger, comprising: a first financial institution system comprising at least one processor programmed to perform operations comprising: accessing onboarding request data from a computing device associated with a first prospective customer, the onboarding request data comprising identifier data describing the first prospective customer; using the identifier data to identify a first block of a distributed ledger comprising first data describing the first prospective customer, the first data being unencrypted, and the first data provided to the distributed ledger by a second financial institution system different than the first financial institution system; verifying the first block of the distributed ledger; using the identifier data to identify a second block of the distributed ledger comprising second data describing the first prospective customer different than the first data, the second data being encrypted; accessing first cryptographic key data associated with the second block of the distributed ledger; decrypting the second data using the first cryptographic key data; and based on the first data and the second data, determining to onboard the first prospective customer.

In Example 2, the subject matter of Example 1 optionally includes the operations further comprising: using the identifier data to identify a third block of the distributed ledger comprising third data describing the first prospective customer different than the first data and the second data, the third data being encrypted differently than the second data; and accessing second cryptographic key data associated with the third block of the distributed ledger.

In Example 3, the subject matter of any one or more of Examples 1-2 optionally includes the accessing of the first cryptographic key data comprising: sending a first cryptographic key request to a ledger management system; and receiving the first cryptographic key data in response to the first cryptographic key request.

In Example 4, the subject matter of any one or more of Examples 1-3 optionally includes the operations further comprising: accessing data describing a second prospective customer; generating third block data, the third block data comprising a first portion of the data describing the second prospective customer; and broadcasting the third block data to be included in the distributed ledger, the first portion of the data describing the second prospective customer being included in the third block data unencrypted.

In Example 5, the subject matter of Example 4 optionally includes the broadcasting of the third block data to be included in the distributed ledger comprising sending the third block data and financial institution identifier data describing the first financial institution system to a ledger management system.

In Example 6, the subject matter of Example 5 optionally includes the operations further comprising: determining, by the ledger management system, the financial institution identifier data is indicated by authorized entity data describing entities authorized to write to the distributed ledger; responsive to determining that the financial institution identifier data is indicated by the authorized entity data, cryptographically signing the third block data, by the ledger management system, to generate signed third block data; and sending, by the ledger management system, the signed third block dated to at least one miner computing system.

In Example 7, the subject matter of any one or more of Examples 4-6 optionally includes the operations further comprising: encrypting a second portion of the data describing the second prospective customer to generate an encrypted second portion of the data describing the second prospective customer; generating fourth block data, the fourth block data comprising the encrypted second portion of the data describing the second prospective customer; and broadcasting the fourth block data to be included in the distributed ledger, the first portion of the data describing the second prospective customer being included in the fourth block data unencrypted.

In Example 8, the subject matter of Example 7 optionally includes at least a portion of the data describing the second prospective customer being generated by a financial institution system.

Example 9 is a method for using a tiered distributed ledger, the method comprising: accessing, by a financial institution system, onboarding request data from a computing device associated with a first prospective customer, the onboarding request data comprising identifier data describing the first prospective customer; using the identifier data to identify a first block of a distributed ledger comprising first data describing the first prospective customer, the first data being unencrypted, and the first data provided to the distributed ledger by a second financial institution system different than the first financial institution system; verifying, by the financial institution system, the first block of the distributed ledger; using the identifier data, by the financial institution system, to identify a second block of the distributed ledger comprising second data describing the first prospective customer different than the first data, the second data being encrypted; accessing, by the financial institution system, first cryptographic key data associated with the second block of the distributed ledger; decrypting the second data, by the financial institution system, using the first cryptographic key data; and based on the first data and the second data, determining, by the financial institution system, to onboard the first prospective customer.

In Example 10, the subject matter of Example 9 optionally includes using the identifier data to identify a third block of the distributed ledger comprising third data describing the first prospective customer different than the first data and the second data, the third data being encrypted differently than the second data; and accessing second cryptographic key data associated with the third block of the distributed ledger.

In Example 11, the subject matter of any one or more of Examples 9-10 optionally includes the accessing of the first cryptographic key data comprising: sending a first cryptographic key request to a ledger management system; and receiving the first cryptographic key data in response to the first cryptographic key request.

In Example 12, the subject matter of any one or more of Examples 9-11 optionally includes accessing, by the financial institution system, data describing a second prospective customer; generating third block data, the third block data comprising a first portion of the data describing the second prospective customer; and broadcasting the third block data to be included in the distributed ledger, the first portion of the data describing the second prospective customer being included in the third block data unencrypted.

In Example 13, the subject matter of Example 12 optionally includes the broadcasting of the third block data to be included in the distributed ledger comprising sending the third block data and financial institution identifier data describing the first financial institution system to a ledger management system.

In Example 14, the subject matter of Example 13 optionally includes determining, by the ledger management system, the financial institution identifier data is indicated by authorized entity data describing entities authorized to write to the distributed ledger; responsive to determining that the financial institution identifier data is indicated by the authorized entity data, cryptographically signing the third block data, by the ledger management system, to generate signed third block data; and sending, by the ledger management system, the signed third block dated to at least one miner computing system.

In Example 15, the subject matter of any one or more of Examples 12-14 optionally includes encrypting a second portion of the data describing the second prospective customer to generate an encrypted second portion of the data describing the second prospective customer; generating fourth block data, the fourth block data comprising the encrypted second portion of the data describing the second prospective customer; and broadcasting the fourth block data to be included in the distributed ledger, the first portion of the data describing the second prospective customer being included in the fourth block data unencrypted.

In Example 16, the subject matter of Example 15 optionally includes at least a portion of the data describing the second prospective customer being generated by the financial institution system.

Example 17 is a non-transitory machine-readable medium comprising instructions thereon that, when executed by at least one processor, cause the at least one processor to perform operations comprising: accessing onboarding request data from a computing device associated with a first prospective customer, the onboarding request data comprising identifier data describing the first prospective customer; using the identifier data to identify a first block of a distributed ledger comprising first data describing the first prospective customer, the first data being unencrypted; verifying the first block of the distributed ledger; using the identifier data to identify a second block of the distributed ledger comprising second data describing the first prospective customer different than the first data, the second data being encrypted; accessing first cryptographic key data associated with the second block of the distributed ledger; decrypting the second data using the first cryptographic key data; and based on the first data and the second data, determining to onboard the first prospective customer.

In Example 18, the subject matter of Example 17 optionally includes the operations further comprising: using the identifier data to identify a third block of the distributed ledger comprising third data describing the first prospective customer different than the first data and the second data, the third data being encrypted differently than the second data; and accessing second cryptographic key data associated with the third block of the distributed ledger.

In Example 19, the subject matter of any one or more of Examples 17-18 optionally includes the accessing of the first cryptographic key data comprising: sending a first cryptographic key request to a ledger management system; and receiving the first cryptographic key data in response to the first cryptographic key request.

In Example 20, the subject matter of any one or more of Examples 17-19 optionally includes the operations further comprising: accessing data describing a second prospective customer; generating third block data, the third block data comprising a first portion of the data describing the second prospective customer; and broadcasting the third block data to be included in the distributed ledger, the first portion of the data describing the second prospective customer being included in the third block data unencrypted.

Figure 8:
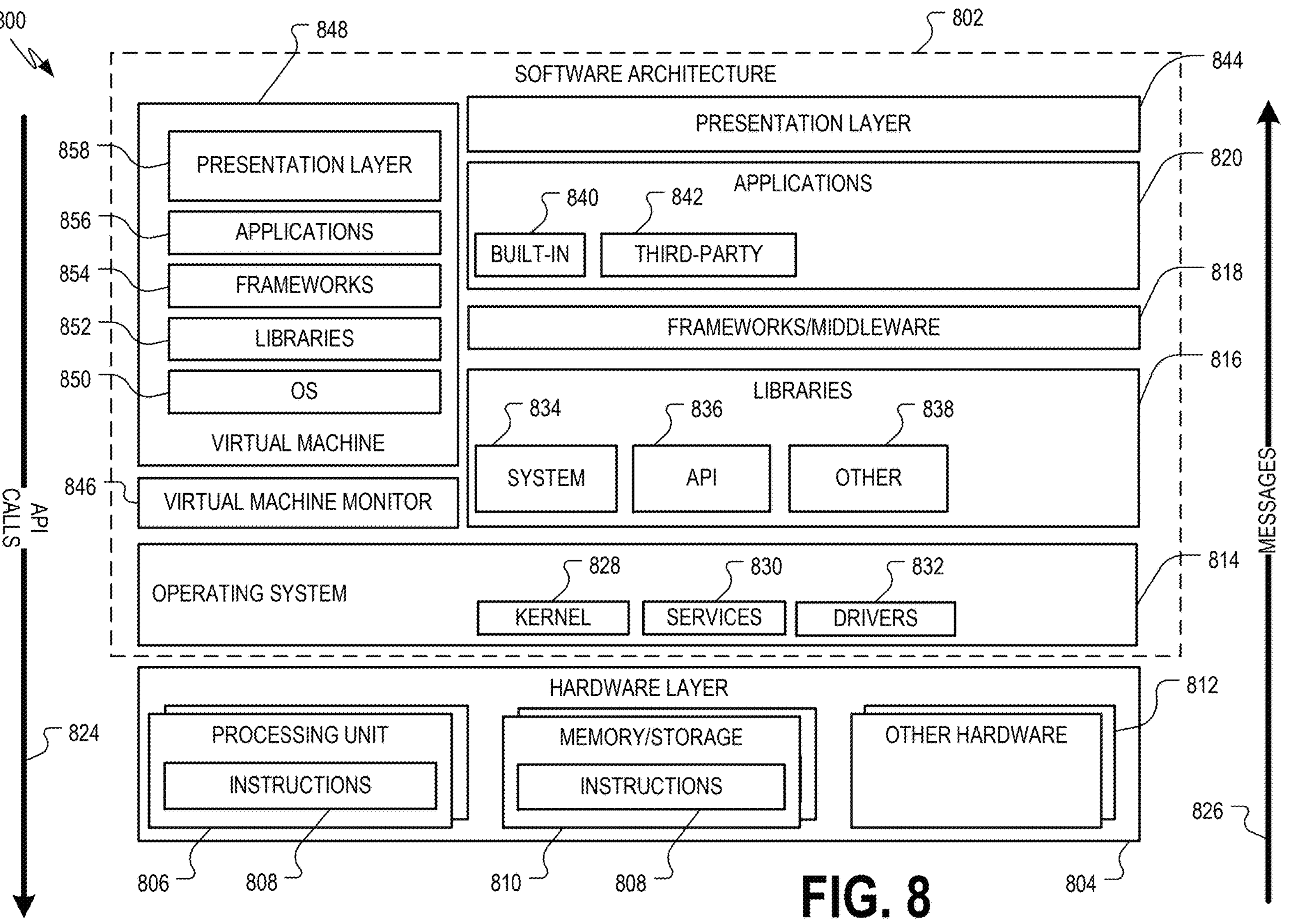
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture 802, and many other architectures may be implemented to facilitate the functionality described herein. A representative hardware layer 804 is illustrated and can represent, for example, any of the above-referenced computing devices. In some examples, the hardware layer 804 may be implemented according to an architecture 900 of FIG. 9.

The representative hardware layer 804 comprises one or more processing units 806 having associated executable instructions 808. The executable instructions 808 represent the executable instructions of the software architecture 802, including implementation of the methods, modules, components, and so forth of FIGS. 1-9. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the architecture 900.

In the example architecture of FIG. 8, the software architecture 802 may be conceptualized as a stack of layers where each layer provides particular functionality. For example, the software architecture 802 may include layers such as an operating system 814, libraries 816, middleware layer 818, applications 820, and a presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of a hardware or software interrupt and, in response, cause the software architecture 802 to pause its current processing and execute an interrupt service routine (ISR) when an interrupt is received. The ISR may generate an alert.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The middleware layer 818 (also sometimes referred to as frameworks) may provide a higher-level common infrastructure that may be utilized by the applications 820 and/or other software components/modules. For example, the middleware layer 818 may provide various graphical UI functions, high-level resource management, high-level location services, and so forth. The middleware layer 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications 840 as well as a broad assortment of other applications. In a specific example, the third-party application 842 (e.g., an application developed using the Android™ or jQS™ software development kit (SDK) by an entity other than the vendor of the particular platform) may be mobile software running on a mobile operating system such as iOS™, Android™, Windows® Phone, or other computing device operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), or middleware layer 818 to create UIs to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by a virtual machine 848. A virtual machine creates a software environment where applications/modules can execute as if they were executing on a hardware computing device. The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Figure 9:
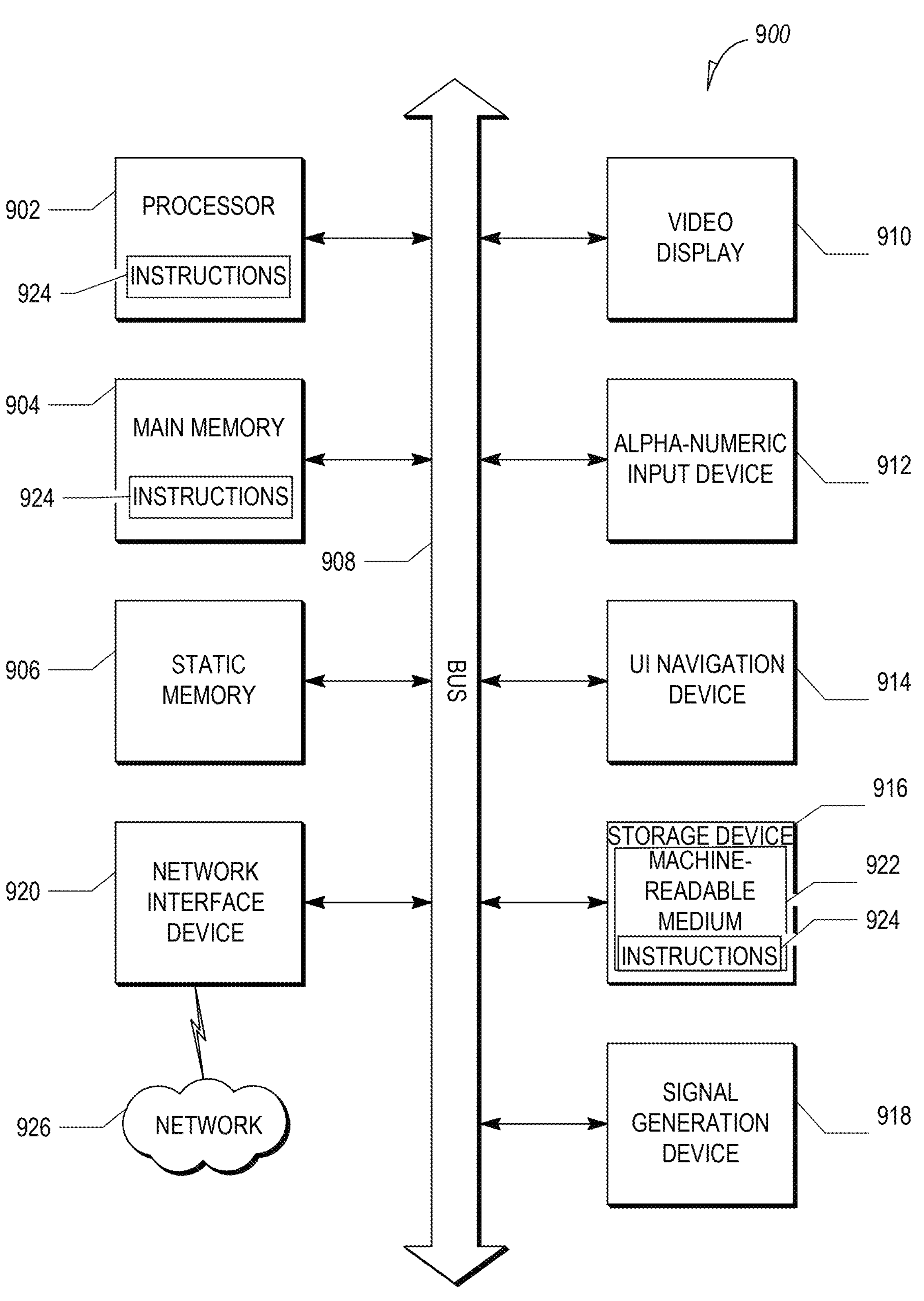
FIG. 9 is a block diagram illustrating a computing device hardware architecture, within which a set or sequence of instructions can be executed to cause a machine to perform examples of any one of the methodologies discussed herein.

FIG. 9 is a block diagram illustrating a computing device hardware architecture 900, within which a set or sequence of instructions can be executed to cause a machine to perform examples of any one of the methodologies discussed herein. The architecture 900 may describe, for example, any of the computing devices and/or control circuits described herein. The architecture 900 may execute the software architecture 802 described with respect to FIG. 8. The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 900 includes a processor unit 902 comprising at least one processor (e.g., a central processing unit (CPU), a graphics processing unit (GPU), or both, processor cores, compute nodes, etc.). The architecture 900 may further comprise a main memory 904 and a static memory 906, which communicate with each other via a link 908 (e.g., a bus). The architecture 900 can further include a video display unit 910, an alphanumeric input device 912 (e.g., a keyboard), and a UI navigation device 914 (e.g., a mouse). In some examples, the video display unit 910, alphanumeric input device 912, and UI navigation device 914 are incorporated into a touchscreen display. The architecture 900 may additionally include a storage device 916 (e.g., a drive unit), a signal generation device 918 (e.g., a speaker), a network interface device 920, and one or more sensors (not shown), such as a GPS sensor, compass, accelerometer, or other sensor.

In some examples, the processor unit 902 or another suitable hardware component may support a hardware interrupt. In response to a hardware interrupt, the processor unit 902 may pause its processing and execute an ISR, for example, as described herein.

The storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, within the static memory 906, and/or within the processor unit 902 during execution thereof by the architecture 900, with the main memory 904, the static memory 906, and the processor unit 902 also constituting machine-readable media. The instructions 924 stored at the machine-readable medium 922 may include, for example, instructions for implementing the software architecture 802, instructions for executing any of the features described herein, etc.

While the machine-readable medium 922 is illustrated in an example to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 7G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 77 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for using a tiered distributed ledger, comprising:

a first financial institution system comprising at least one processor programmed to perform operations comprising:

accessing onboarding request data from a computing device associated with a first prospective customer, the onboarding request data comprising identifier data describing the first prospective customer;

using the identifier data to identify a first block of a distributed ledger comprising first data describing the first prospective customer, the first data being unencrypted, and the first data provided to the distributed ledger by a second financial institution system different than the first financial institution system;

verifying the first block of the distributed ledger;

using the identifier data to identify a second block of the distributed ledger comprising second data describing the first prospective customer different than the first data, the second data being encrypted;

accessing first cryptographic key data associated with the second block of the distributed ledger;

decrypting the second data using the first cryptographic key data; and based on the first data and the second data, determining to onboard the first prospective customer.

2. The system of claim 1, the operations further comprising:

using the identifier data to identify a third block of the distributed ledger comprising third data describing the first prospective customer different than the first data and the second data, the third data being encrypted differently than the second data; and accessing second cryptographic key data associated with the third block of the distributed ledger.

3. The system of claim 1, the accessing of the first cryptographic key data comprising:

sending a first cryptographic key request to a ledger management system; and receiving the first cryptographic key data in response to the first cryptographic key request.

4. The system of claim 1, the operations further comprising:

accessing data describing a second prospective customer;

generating third block data, the third block data comprising a first portion of the data describing the second prospective customer; and broadcasting the third block data to be included in the distributed ledger, the first portion of the data describing the second prospective customer being included in the third block data unencrypted.

5. The system of claim 4, the broadcasting of the third block data to be included in the distributed ledger comprising sending the third block data and financial institution identifier data describing the first financial institution system to a ledger management system.

6. The system of claim 5, the operations further comprising:

determining, by the ledger management system, the financial institution identifier data is indicated by authorized entity data describing entities authorized to write to the distributed ledger;

responsive to determining that the financial institution identifier data is indicated by the authorized entity data, cryptographically signing the third block data, by the ledger management system, to generate signed third block data; and sending, by the ledger management system, the signed third block dated to at least one miner computing system.

7. The system of claim 4, the operations further comprising:

encrypting a second portion of the data describing the second prospective customer to generate an encrypted second portion of the data describing the second prospective customer;

generating fourth block data, the fourth block data comprising the encrypted second portion of the data describing the second prospective customer; and broadcasting the fourth block data to be included in the distributed ledger, the first portion of the data describing the second prospective customer being included in the fourth block data unencrypted.

8. The system of claim 7, at least a portion of the data describing the second prospective customer being generated by a financial institution system.

9. A method for using a tiered distributed ledger, the method comprising:

accessing, by a financial institution system, onboarding request data from a computing device associated with a first prospective customer, the onboarding request data comprising identifier data describing the first prospective customer;

using the identifier data to identify a first block of a distributed ledger comprising first data describing the first prospective customer, the first data being unencrypted, and the first data provided to the distributed ledger by a second financial institution system different than the first financial institution system;

verifying, by the financial institution system, the first block of the distributed ledger;

using the identifier data, by the financial institution system, to identify a second block of the distributed ledger comprising second data describing the first prospective customer different than the first data, the second data being encrypted;

accessing, by the financial institution system, first cryptographic key data associated with the second block of the distributed ledger;

decrypting the second data, by the financial institution system, using the first cryptographic key data; and based on the first data and the second data, determining, by the financial institution system, to onboard the first prospective customer.

10. The method of claim 9, further comprising:

using the identifier data to identify a third block of the distributed ledger comprising third data describing the first prospective customer different than the first data and the second data, the third data being encrypted differently than the second data; and accessing second cryptographic key data associated with the third block of the distributed ledger.

11. The method of claim 9, the accessing of the first cryptographic key data comprising:

sending a first cryptographic key request to a ledger management system; and receiving the first cryptographic key data in response to the first cryptographic key request.

12. The method of claim 9, further comprising:

accessing, by the financial institution system, data describing a second prospective customer;

generating third block data, the third block data comprising a first portion of the data describing the second prospective customer; and broadcasting the third block data to be included in the distributed ledger, the first portion of the data describing the second prospective customer being included in the third block data unencrypted.

13. The method of claim 12, the broadcasting of the third block data to be included in the distributed ledger comprising sending the third block data and financial institution identifier data describing the first financial institution system to a ledger management system.

14. The method of claim 13, further comprising:

determining, by the ledger management system, the financial institution identifier data is indicated by authorized entity data describing entities authorized to write to the distributed ledger;

responsive to determining that the financial institution identifier data is indicated by the authorized entity data, cryptographically signing the third block data, by the ledger management system, to generate signed third block data; and sending, by the ledger management system, the signed third block dated to at least one miner computing system.

15. The method of claim 12, further comprising:

encrypting a second portion of the data describing the second prospective customer to generate an encrypted second portion of the data describing the second prospective customer;

generating fourth block data, the fourth block data comprising the encrypted second portion of the data describing the second prospective customer; and broadcasting the fourth block data to be included in the distributed ledger, the first portion of the data describing the second prospective customer being included in the fourth block data unencrypted.

16. The method of claim 15, at least a portion of the data describing the second prospective customer being generated by the financial institution system.

17. A non-transitory machine-readable medium comprising instructions thereon that, when executed by at least one processor, cause the at least one processor to perform operations comprising:

accessing onboarding request data from a computing device associated with a first prospective customer, the onboarding request data comprising identifier data describing the first prospective customer;

using the identifier data to identify a first block of a distributed ledger comprising first data describing the first prospective customer, the first data being unencrypted;

verifying the first block of the distributed ledger;

using the identifier data to identify a second block of the distributed ledger comprising second data describing the first prospective customer different than the first data, the second data being encrypted;

accessing first cryptographic key data associated with the second block of the distributed ledger;

decrypting the second data using the first cryptographic key data; and based on the first data and the second data, determining to onboard the first prospective customer.

18. The non-transitory machine-readable medium of claim 17, the operations further comprising:

using the identifier data to identify a third block of the distributed ledger comprising third data describing the first prospective customer different than the first data and the second data, the third data being encrypted differently than the second data; and accessing second cryptographic key data associated with the third block of the distributed ledger.

19. The non-transitory machine-readable medium of claim 17, the accessing of the first cryptographic key data comprising:

sending a first cryptographic key request to a ledger management system; and receiving the first cryptographic key data in response to the first cryptographic key request.

20. The non-transitory machine-readable medium of claim 17, the operations further comprising:

accessing data describing a second prospective customer;

generating third block data, the third block data comprising a first portion of the data describing the second prospective customer; and broadcasting the third block data to be included in the distributed ledger, the first portion of the data describing the second prospective customer being included in the third block data unencrypted.

* * * * *